(12) United States Patent
Taniguchi et al.

(10) Patent No.: US 11,165,737 B2
(45) Date of Patent: Nov. 2, 2021

(54) INFORMATION PROCESSING APPARATUS FOR CONVERSION BETWEEN ABBREVIATED NAME AND FORMAL NAME

(71) Applicant: FUJIFILM Business Innovation Corp., Tokyo (JP)

(72) Inventors: Motoki Taniguchi, Kanagawa (JP); Tomoko Okuma, Kanagawa (JP); Tomoki Taniguchi, Kanagawa (JP); Shotaro Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 14 days.

(21) Appl. No.: 15/969,782

(22) Filed: May 3, 2018

(65) Prior Publication Data

US 2019/0089670 A1    Mar. 21, 2019

(30) Foreign Application Priority Data

Sep. 19, 2017   (JP) .............................. JP2017-179319

(51) Int. Cl.
*H04L 12/58* (2006.01)
*G06Q 10/10* (2012.01)

(52) U.S. Cl.
CPC .......... *H04L 51/32* (2013.01); *G06Q 10/107* (2013.01); *H04L 51/16* (2013.01); *H04L 51/20* (2013.01); *H04L 51/28* (2013.01)

(58) Field of Classification Search
CPC ..... G06F 16/904; G06Q 10/107; H04L 51/32; H04L 51/28

USPC ............................................. 709/206; 707/10
See application file for complete search history.

(56) References Cited

U.S. PATENT DOCUMENTS

| 7,065,483 | B2* | 6/2006 | Decary ............... | G06F 16/9535 |
| | | | | 704/7 |
| 7,236,923 | B1* | 6/2007 | Gupta ................... | G06F 40/284 |
| | | | | 704/9 |
| 9,020,819 | B2* | 4/2015 | Saitoh .................. | G10L 15/197 |
| | | | | 704/251 |
| 2016/0070792 | A1* | 3/2016 | Yuan .................... | G06F 40/205 |
| | | | | 707/770 |

FOREIGN PATENT DOCUMENTS

| JP | 2008077335 | | 4/2008 |
| JP | 2010211256 | A * | 9/2010 |
| JP | 4998302 | | 8/2012 |
| JP | 5443788 | | 3/2014 |

* cited by examiner

*Primary Examiner* — Shirley X Zhang
(74) *Attorney, Agent, or Firm* — JCIPRNET

(57) ABSTRACT

An information processing apparatus includes an acquisition unit that acquires an information group in which an abbreviated name is used, a specification unit that specifies a position where the abbreviated name is used in the information group from a type of information group acquired, a first extraction unit that extracts the abbreviated name from the specified position, a second extraction unit that extracts a formal name on the basis of a character related to the information group, and an association unit that associates the abbreviated name and the formal name with each other.

10 Claims, 7 Drawing Sheets

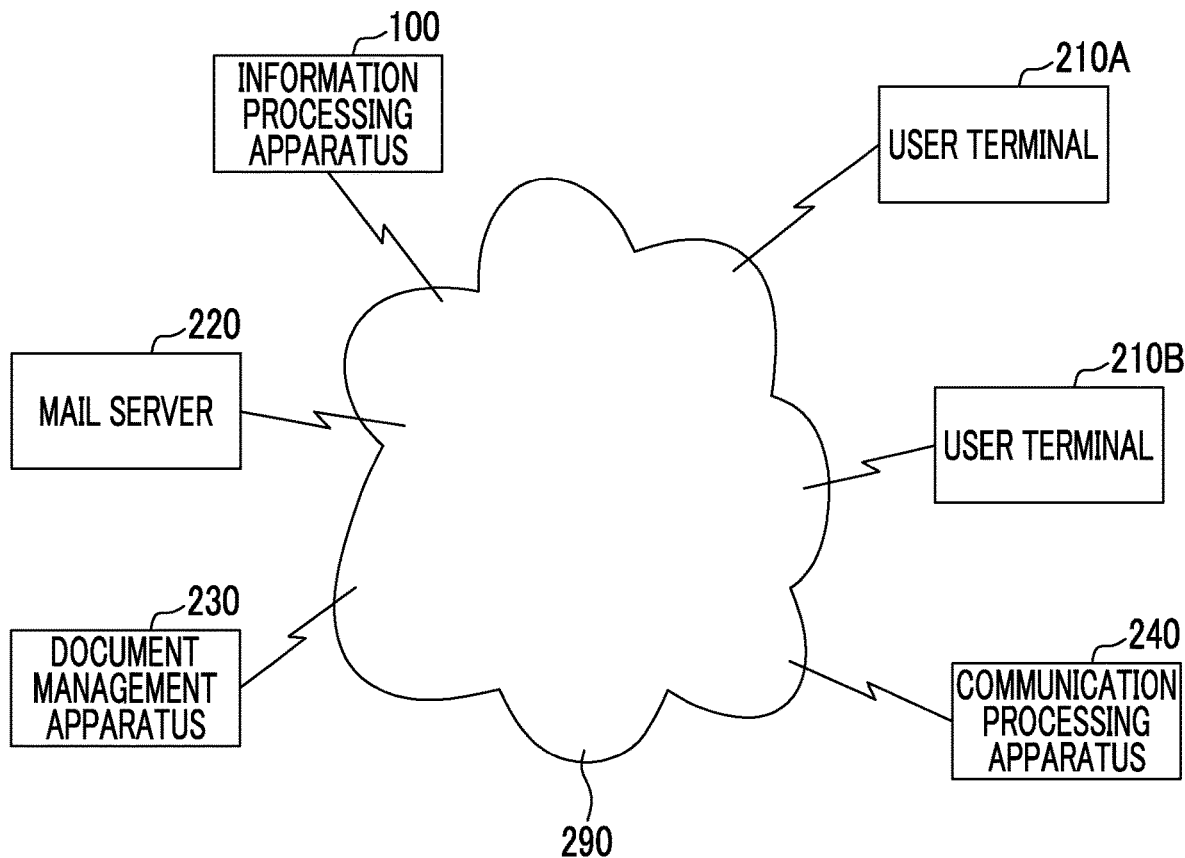

FIG. 4

| 410 | 420 | 430 | 440 |
|---|---|---|---|
| USER ID | NAME | MAIL ADDRESS | BELONGING ORGANIZATION |
| U0011 | ○○ △△ | ○○△△@FXABCD.co.jp | ABCD DEPARTMENT |

| 510 | 520 | 530 |
|---|---|---|
| CORRESPONDENCE ID | ABBREVIATED NAME | FORMAL NAME |
| R001 | AB DEPARTMENT | ABCD DEPARTMENT |

500

INFORMATION PROCESSING APPARATUS FOR CONVERSION BETWEEN ABBREVIATED NAME AND FORMAL NAME

CROSS-REFERENCE TO RELATED APPLICATIONS

This application is based on and claims priority under 35 USC 119 from Japanese Patent Application No. 2017-179319 filed Sep. 19, 2017.

BACKGROUND

Technical Field

The present invention relates to an information processing apparatus.

SUMMARY

According to an aspect of the invention, there is provided an information processing apparatus including an acquisition unit that acquires an information group in which an abbreviated name is used, a specification unit that specifies a position where the abbreviated name is used in the information group from a type of information group acquired, a first extraction unit that extracts the abbreviated name from the specified position, a second extraction unit that extracts a formal name on the basis of a character related to the information group, and an association unit that associates the abbreviated name and the formal name with each other.

BRIEF DESCRIPTION OF THE DRAWINGS

Exemplary embodiment(s) of the present invention will be described in detail based on the following figures, wherein:

FIG. 2 is a diagram illustrating a system configuration example using this exemplary embodiment;

FIG. 3 is a diagram illustrating an example of a data structure of an abbreviated name description location table;

FIG. 4 is a diagram illustrating an example of a data structure of a character belonging table;

FIG. 5 is a diagram illustrating an example of a data structure of an abbreviated name-formal name pair table;

DETAILED DESCRIPTION

Hereinafter, an example of an exemplary embodiment in realizing the invention will be described with reference to the accompanying drawings.

Figure 1:
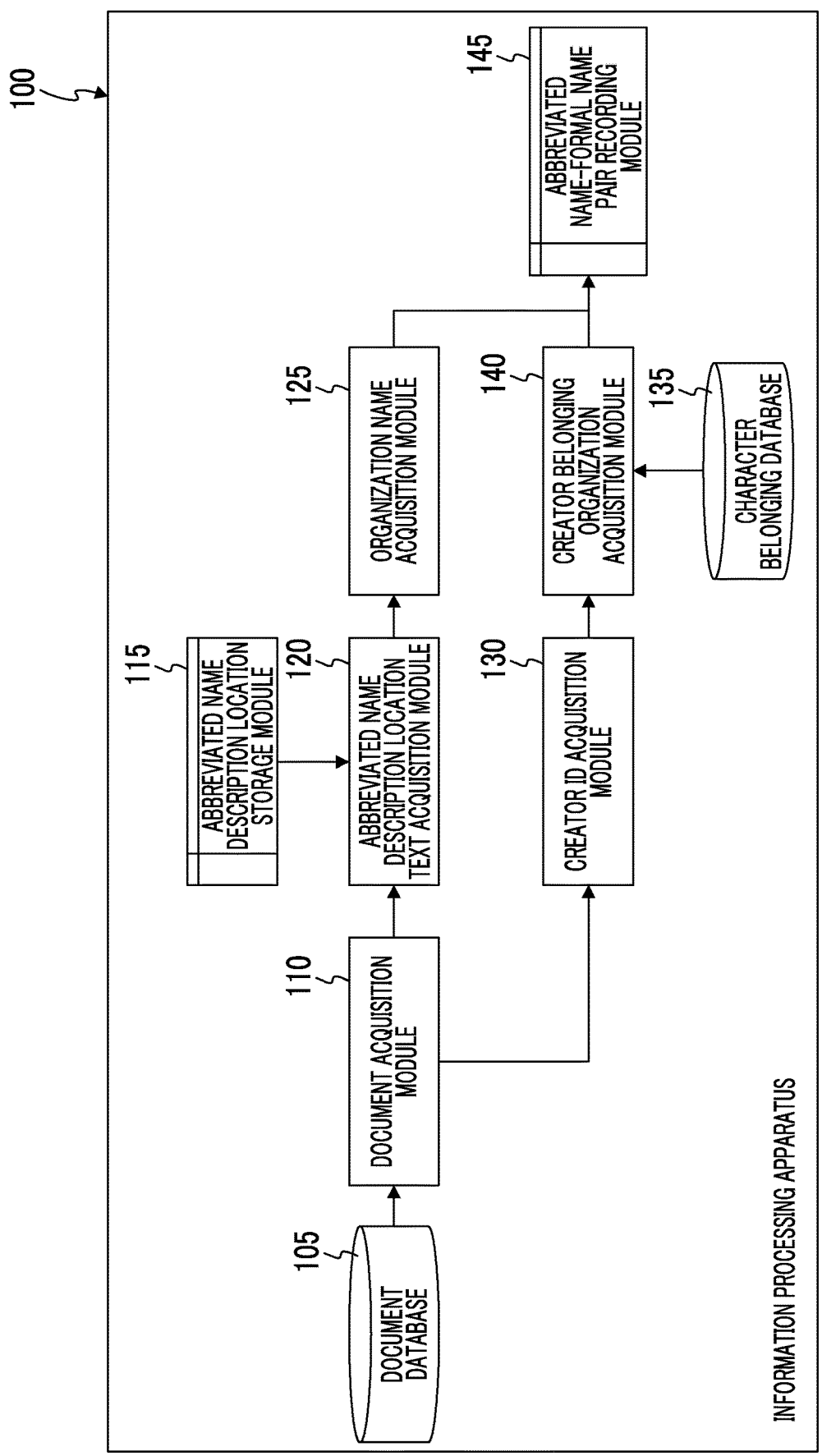
FIG. 1 is a conceptual module configuration diagram illustrating a configuration example according to this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations maybe configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment is an apparatus that associates an abbreviated name and a formal name of the abbreviated name with each other, and includes a document database 105, a document acquisition module 110, an abbreviated name description location storage module 115, an abbreviated name description location text acquisition module 120, an organization name acquisition module 125, a creator ID acquisition module 130, a character belonging database 135, a creator belonging organization acquisition module 140, and an abbreviated name-formal name pair recording module 145, as illustrated in the example of FIG. 1.

The document database 105 is connected to the document acquisition module 110. The document database 105 stores an information group (hereinafter, also referred to as a document) in which an abbreviated name is used. Here, the "abbreviated name" refers to a letter string which is described by simplifying a formal name. Specifically, the abbreviated name refers to a letter string described by omitting a portion of a letter string in the formal name. In particular, a proper noun is a target as the formal name. For example, the abbreviated name may be an abbreviated name of an organization name (including a company name, a group name, a department name, and the like). Therefore, the formal name in this case is a formal organization name.

The document acquisition module 110 is connected to the document database 105, the abbreviated name description location text acquisition module 120, and the creator ID acquisition module 130. The document acquisition module 110 acquires an information group in which an abbreviated name is used, from the document database 105.

The abbreviated name description location storage module 115 is connected to the abbreviated name description location text acquisition module 120. The abbreviated name description location storage module 115 stores the type of information group and a position where the abbreviated name is described. For example, the abbreviated name description location storage module stores an abbreviated name description location table 300. FIG. 3 is a diagram illustrating an example of a data structure of the abbreviated name description location table 300. The abbreviated name description location table 300 includes a description location ID column 310, a type column 320, and an abbreviated name description location column 330. The description location ID column 310 stores information (description location identification (ID)) for uniquely identifying a description location in this exemplary embodiment. The type column 320 stores the type of information group. This is because a position where an abbreviated name is easily used varies depending on the type of information group. The abbreviated name description location column 330 stores a position where the abbreviated name is described in the information group. Here, the specification of the position may be a physical position (for example, a position capable of being represented by coordinates, or the like), may be a position in a letter string (for example, a position within a predetermined number of letters from the head, a position within the last paragraph, or the like), or may be a position (for example, a letter string following a predetermined letter string, or the like) which satisfies predetermined conditions.

For example, regarding a description location ID: K001, a type is an "electronic mail", and an abbreviated name description location is a "greeting phrase". This is because an abbreviated name of a transmitter's belonging organization is easily written in the greeting phrase of the electronic mail.

Regarding a description location ID: K002, a type is a "document", and an abbreviated name description location is an "upper right table" (a table in which a creation date, an organization name (abbreviated name), a creator, and the like are described on the upper right side of the document). This is because an abbreviated name of a creator's belonging organization is easily written at a specific position in a business document. This is because a form (model) is determined in, for example, a business form, a company memo document, and the like, and a position where a belonging organization is to be described is specified.

Regarding a description location ID: K003, a type is a "conversation history", and an abbreviated name description location is specified by a predetermined letter string (for example, "name@organization name" as a regular expression). This is because "name @organization name" is easily written in a communication channel and the like having a large number of informal expressions, and the organization name is an abbreviated name in many cases.

The abbreviated name description location text acquisition module 120 is connected to the document acquisition module 110, the abbreviated name description location storage module 115, and the organization name acquisition module 125. The abbreviated name description location text acquisition module 120 specifies a position where an abbreviated name is used in an information group which is acquired by the document acquisition module 110, from the type of information group. Text having an abbreviated name described therein is acquired.

The organization name acquisition module 125 is connected to the abbreviated name description location text acquisition module 120 and the abbreviated name-formal name pair recording module 145. The organization name acquisition module 125 extracts an abbreviated name from the position specified by the abbreviated name description location text acquisition module 120. For example, an abbreviated name of an organization name is extracted using a specific expression recognition technique (also referred to as specific expression extraction; named entity extraction) or the like.

Additionally, in a case where plural abbreviated names are present at the position specified by the abbreviated name description location text acquisition module 120 (that is, in a case where plural abbreviated names may be extracted), the organization name acquisition module 125 may extract one of the plural abbreviated names. For example, an abbreviated name of which the described order is a predetermined order (for example, the first or the last) may be extracted, an abbreviated name having the largest number of letters (or an abbreviated name having the smallest number of letters) may be extracted, or an abbreviated name similar to the formal name extracted by the creator belonging organization acquisition module 140 may be extracted. Here, the similarity may be determined in accordance with the number of same letters used between both names (specifically, a pair having the largest number of same letters are determined to be similar names), and it is assumed that the same letters are arranged in the same order.

Additionally, in a case where plural abbreviated names are present at the position specified by the abbreviated name description location text acquisition module 120, the organization name acquisition module 125 may extract all of the abbreviated names. Here, in a case where the number of formal names extracted by the creator belonging organization acquisition module 140 is one, the one formal name has plural abbreviated names, and the number of pairs each including an abbreviated name and a formal name is two or more (the number of abbreviated names). Additionally, in a case where the number of formal names extracted by the creator belonging organization acquisition module 140 is two or more, the abbreviated names and the formal names are compared with each other, and similar pairs may be selected.

The creator ID acquisition module 130 is connected to the document acquisition module 110 and the creator belonging organization acquisition module 140. The creator ID acquisition module 130 acquires a character related to a target information group from meta information (including, for example, property information and the like) of an information group. For example, an identifier (user ID) for specifying the character is acquired.

The character belonging database 135 is connected to the creator belonging organization acquisition module 140. The character belonging database 135 stores a formal organization name to which a character belongs. Specifically, a user ID and a formal organization name to which a character having the user ID belongs are stored in association with each other. For example, a character belonging table 400 is stored. FIG. 4 is a diagram illustrating an example of a data structure of the character belonging table 400. The character belonging table 400 includes a user ID column 410, a name column 420, a mail address column 430, and a belonging organization column 440. The user ID column 410 stores information (user ID) for uniquely identifying a user in this exemplary embodiment. The name column 420 stores the name of the user having the user ID. The mail address column 430 stores a mail address of the user. The belonging organization column 440 stores a formal organization name to which the user belongs.

For example, regarding a user ID: U0011, a name is "○○ΔΔ", a mail address is "○○ΔΔ@FXABCD.co.jp", and a belonging organization is an "ABCD department".

The creator belonging organization acquisition module 140 is connected to the creator ID acquisition module 130, the character belonging database 135, and the abbreviated name-formal name pair recording module 145. The creator belonging organization acquisition module 140 extracts a formal name on the basis of characters related to an information group. Here, the "characters related to an information group" include a creator of the information group, and the like. In addition, as a method of "extracting a formal name", for example, a table in which a user ID and an organization to which a user having the user ID are stored in association with each other may be retrieved to extract a formal name from the user ID or to extract a formal name described in an information group.

In addition, the creator belonging organization acquisition module 140 may extract an organization to which a character belongs to, as the formal name.

The creator belonging organization acquisition module 140 associates the abbreviated name extracted by the organization name acquisition module 125 and the formal name extracted by the creator belonging organization acquisition module 140 with each other.

Additionally, in a case where plural formal names may be extracted, the creator belonging organization acquisition module 140 may extract one of the formal names. For example, an organization having the latest date, among dates when a target user (a user having the user ID acquired by the creator ID acquisition module 130) belongs to organizations, may be extracted. Naturally, in this case, the date when the user belongs to the organization may be added to the character belonging table 400. In addition, a major organization of the target user may be extracted. Naturally, in this case, information indicating whether an organization is major (or subordinate) is added to the character belonging table 400. In addition, a formal name similar to an abbreviated name may be extracted. As described above, the same process as the determination regarding whether an abbreviated name and a formal name are similar to each other, which is performed by the organization name acquisition module 125, maybe performed. Additionally, in a case where an information group is an electronic mail, the same (or similar) organization as an organization to which a receiver belongs may be selected. Additionally, in a case where the information group is a document, the same (or similar) organization as an organization to which a reporting destination belongs may be selected. Additionally, in a case where the information group is a conversation history, the same (or similar) organization as an organization to which a conversation party belongs may be selected.

Additionally, in a case where plural formal names are extracted, the creator belonging organization acquisition module 140 may extract all of the formal names. In this case, the abbreviated names (may be one or two or more) which are extracted by the organization name acquisition module 125 and the formal names are compared with each other, and pairs each including similar names may be selected. As described above, the same process as the determination regarding whether the abbreviated name and the formal name are similar to each other, which is performed by the organization name acquisition module 125, may be performed.

The abbreviated name-formal name pair recording module 145 is connected to the organization name acquisition module 125 and the creator belonging organization acquisition module 140. The abbreviated name-formal name pair recording module 145 stores pairs each including an abbreviated name and a formal name which are associated with each other by the creator belonging organization acquisition module 140. For example, an abbreviated name-formal name pair table 500 is stored. FIG. 5 is a diagram illustrating an example of a data structure of the abbreviated name-formal name pair table 500. The abbreviated name-formal name pair table 500 includes a correspondence ID column 510, an abbreviated name column 520, and a formal name column 530. The correspondence ID column 510 stores information (correspondence ID) for uniquely identifying pairs each including an abbreviated name and a formal name in this exemplary embodiment. The abbreviated name column 520 stores an abbreviated name. The formal name column 530 stores the original formal name of the abbreviated name.

For example, regarding a correspondence ID: R001, an abbreviated name is an "AB department", and a formal name is an "ABCD department".

For example, as the information group, an electronic mail may be set to be a target. In this case, a character related to the information group is a transmitter of the electronic mail.

The organization name acquisition module 125 extracts an abbreviated name from a greeting phrase included in the electronic mail.

The creator belonging organization acquisition module 140 extracts an organization to which the transmitter of the electronic mail belongs, as a formal name.

In addition, for example, as the information group, a document may be set to be a target. In this case, a character related to the information group is a creator of the document.

The organization name acquisition module 125 extracts an abbreviated name from a predetermined location in the document. Here, as the "predetermined location", a column in which a creator included in the document is described, or the like may be used.

The creator belonging organization acquisition module 140 extracts an organization to which the creator of the document belongs, as a formal name.

In addition, for example, as the information group, a conversation history may be set to be a target. In this case, a character related to the information group is a person concerned with the conversation (conversation person).

The organization name acquisition module 125 extracts an abbreviated name form a predetermined letter string included in the conversation history. Here, examples of the "predetermined letter string" include a letter string group described using a regular expression.

The creator belonging organization acquisition module 140 extracts an organization to which the person concerned with the conversation belongs, as a formal name.

FIG. 2 is a diagram illustrating a system configuration example using this exemplary embodiment.

The information processing apparatus 100, a user terminal 210A, a user terminal 210B, a mail server 220, a document management apparatus 230, and a communication processing apparatus 240 are connected to each other through a communication line 290. The communication line 290 may be a wireless line, a wired line, or a combination thereof, and may be, for example, the Internet, an intranet, or the like as communication infrastructure. In addition, the functions of the information processing apparatus 100, the mail server 220, the document management apparatus 230, and the communication processing apparatus 240 may be realized as cloud service.

The mail server 220, the document management apparatus 230, and the communication processing apparatus 240 are used by the user terminal 210. For example, in a case where an electronic mail is transmitted from the user terminal 210A to the user terminal 210B, the electronic mail goes through the mail server 220, and thus the mail server 220 may collect electronic mails. In addition, the document management apparatus 230 receives a request for the storage of a document from the user terminal 210, stores the document, and provides a service such as viewing. Therefore, the document management apparatus 230 may collect documents. Here, the document (also referred to as a file) is text data, numerical value data, figure data, image data, movie data, sound data, or a combination thereof, is a target for storage, editing, retrieval, and the like, refers to a document replaceable as an individual unit between systems or users, and includes a document similar to these documents. Specifically, the document includes a document created by a document creation program, an image which is read by an image reader (scanner or the like), a Web page, and the like. Additionally, in a case where conversation using the communication processing apparatus 240 is performed between the user terminal 210A and the user terminal 210B, the conversation history is recorded in the communication processing apparatus 240. Examples of the conversation include conversation (talk, a direct comment, and the like) through a chatting system and Social Networking Service (SNS), and the like, and also include conversation performed in a group, in addition to conversation performed on a one-to-one basis.

For example, the mail server 220 collects target electronic mails, and stores the collected electronic mails in the document database 105 of the information processing apparatus 100. In addition, the document management apparatus 230 collects target documents, and stores the collected target documents in the document database 105 of the information processing apparatus 100. In addition, the communication processing apparatus 240 collects target conversation histories, and stores the collected conversation histories in the document database 105 of the information processing apparatus 100.

In addition, the document acquisition module 110 of the information processing apparatus 100 may collect electronic mail information, a document, and a conversation history as an information group from the mail server 220, the document management apparatus 230, and the communication processing apparatus 240. In this case, the document database 105 may be dispensed with.

A conversion rule for converting an abbreviated name into a formal name or vice versa has been used. However, as described above, the abbreviated name is perceived only when the abbreviated name is used in reality. Therefore, it is difficult to generate a conversion rule having all combinations reflected therein.

The information processing apparatus 100 extracts an abbreviated name from an electronic mail, a document, and conversation information in which the abbreviated name is actually used, and associates the extracted abbreviated name with a formal name. The pair of the abbreviated name and the formal name is used to convert the abbreviated name into the formal name or vice versa. Specifically, the pair maybe used as it is for a conversion dictionary used for a conversion dictionary (FEP), an Input Method Editor (IME), kana-kanji conversion software, and the like (that is, the pair may be configured as a conversion rule, or may be configured to form a portion of the conversion rule), or may be used as teacher data for machine learning.

Figure 6:
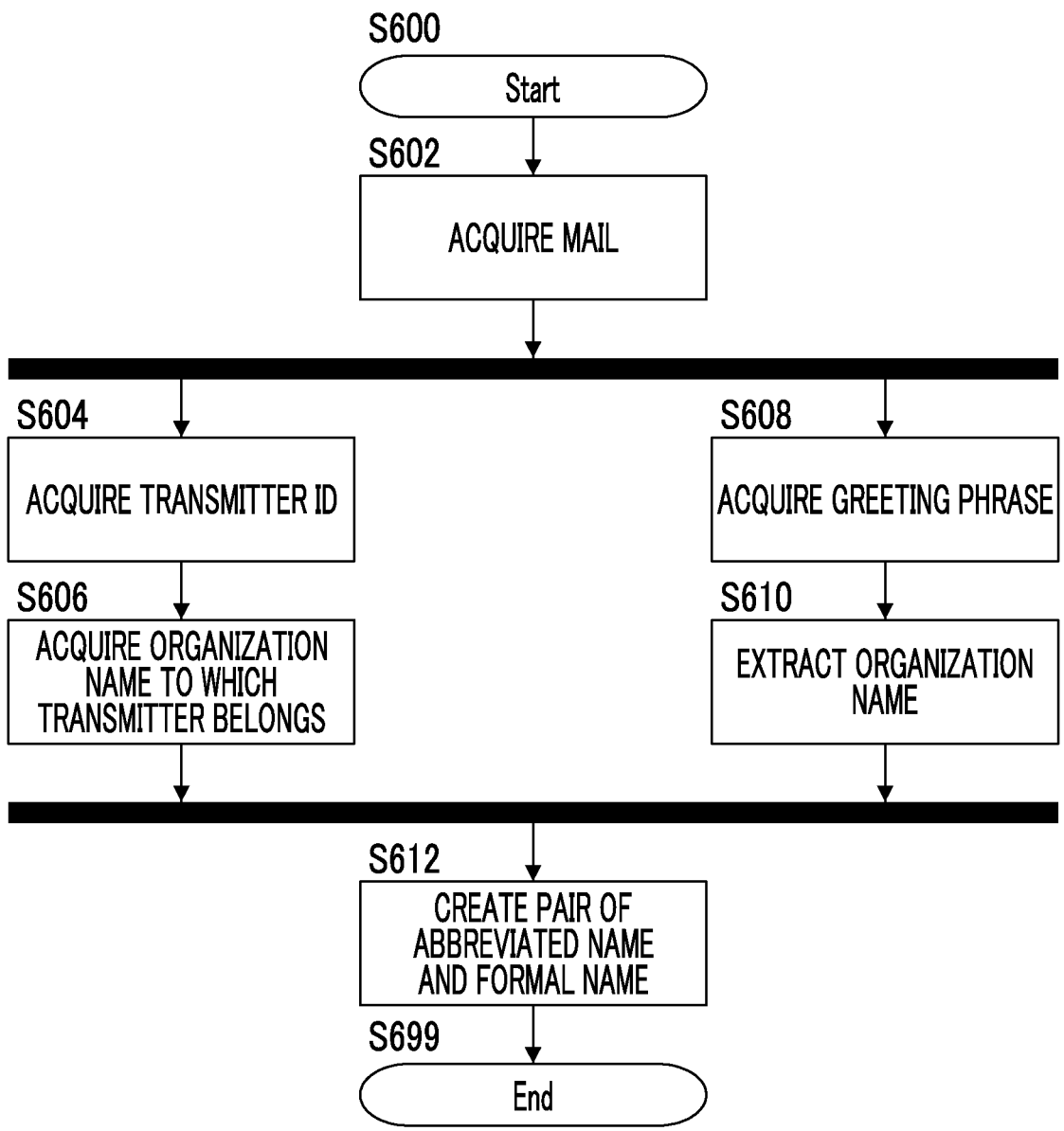
FIG. 6 is a flowchart illustrating a processing example according to this exemplary embodiment.

FIG. 6 is a flowchart illustrating a processing example according to this exemplary embodiment. The drawing illustrates a processing example in a case where a target information group is set to be an electronic mail.

In step S602, the document acquisition module 110 acquires a target electronic mail.

In step S604, the creator ID acquisition module 130 acquires a transmitter ID (maybe a mail address). For example, the transmitter ID is acquired from a From portion in the head of the electronic mail.

In step S606, the creator belonging organization acquisition module 140 acquires an organization name to which a transmitter belongs. Specifically, a belonging organization corresponding to the transmitter ID (user ID) is acquired using the character belonging table 400. In addition, here, the belonging organization may be acquired from a signature column in the body text of the electronic mail without using the character belonging table 400.

In step S608, the abbreviated name description location text acquisition module 120 acquires a greeting phrase and the like. Specifically, the greeting phrase and the like in the body text of the electronic mail are extracted using the abbreviated name description location table 300. For example, a greeting phrase such as "Thank you for the hard work. I am ○○ of the AB department." is extracted.

In step S610, the organization name acquisition module 125 extracts an organization name which is an abbreviated name. Specifically, the abbreviated name of the organization name is extracted from the greeting phrase acquired in step S608. The above-described specific expression recognition technique may be used.

In step S612, the creator belonging organization acquisition module 140 creates a pair of an abbreviated name and a formal name is created using the formal organization name acquired in step S606 and the abbreviated name extracted in step S610.

Step S604 and step S608 are performed after step S602 is performed.

Any one of the processes of extracting a formal name which are performed in step S604 and step S606 and the processes of extracting an abbreviated name which are performed in step S608 and step S610 may be performed first, or the processes may be performed in parallel.

Figure 7:
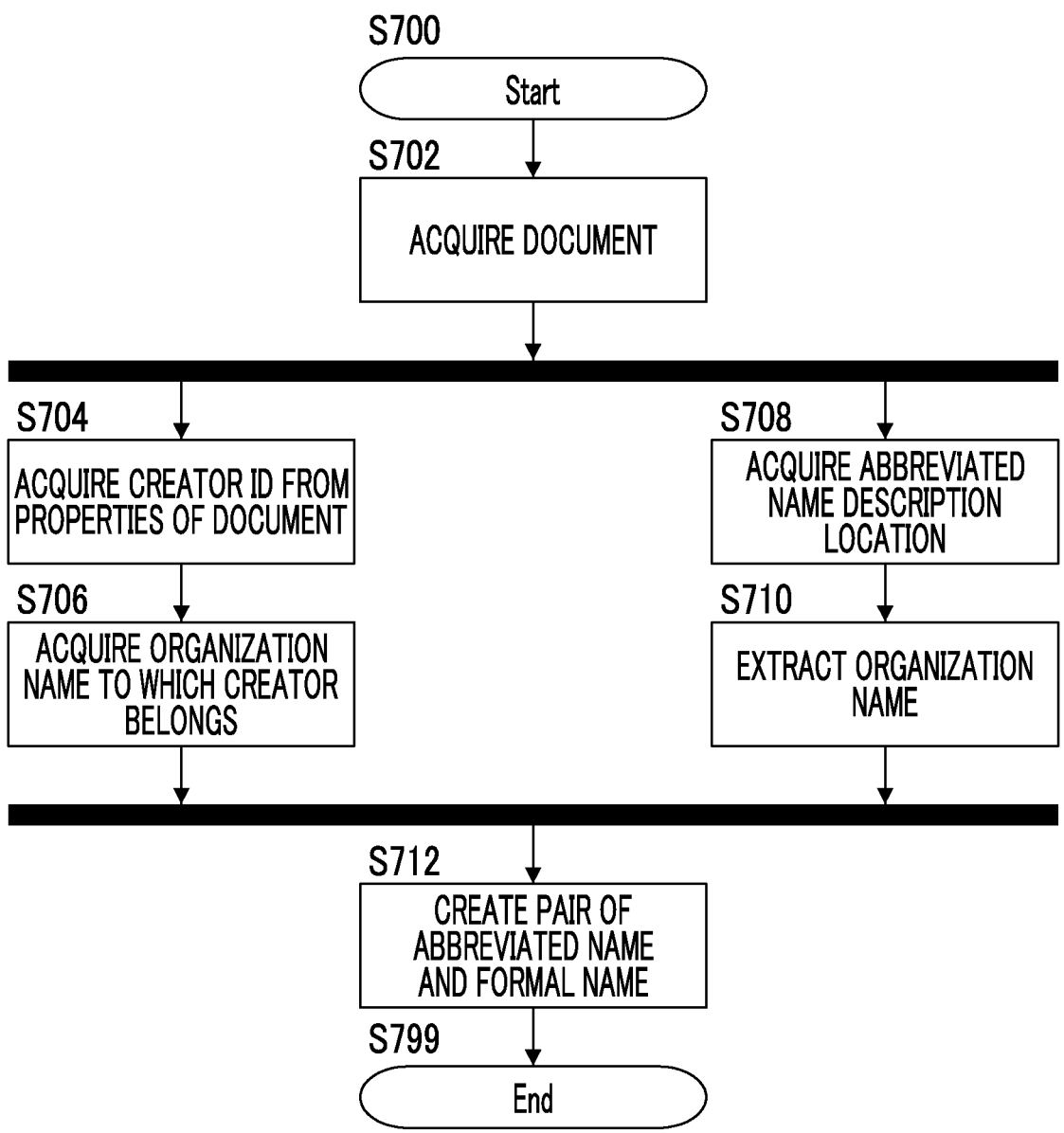
FIG. 7 is a flowchart illustrating a processing example according to this exemplary embodiment.

FIG. 7 is a flowchart illustrating a processing example according to this exemplary embodiment. The drawing illustrates a processing example in a case where a target information group is set to be a document.

In step S702, the document acquisition module 110 acquires a target document.

In step S704, the creator ID acquisition module 130 acquires a creator ID from properties of the document.

In step S706, the creator belonging organization acquisition module 140 acquires an organization name to which the creator belongs. Specifically, a belonging organization corresponding to the creator ID (user ID) is acquired using the character belonging table 400.

In step S708, the abbreviated name description location text acquisition module 120 acquires an abbreviated name description location. Specifically, a table positioned on the upper right side of the document, and the like are extracted using the abbreviated name description location table 300.

In step S710, the organization name acquisition module 125 extracts an organization name which is an abbreviated name. Specifically, the abbreviated name of the organization name is extracted from a predetermined row (for example, a second row or the like, or a row written as a "belonging organization") in the table acquired in step S708.

In step S712, the creator belonging organization acquisition module 140 creates a pair of an abbreviated name and a formal name is created using the formal organization name acquired in step S706 and the abbreviated name extracted in step S710.

Step S704 and step S708 are performed after step S702 is performed.

Any one of the processes of extracting a formal name which are performed in step S704 and step S706 and the processes of extracting an abbreviated name which are performed in step S708 and step S710 may be performed first, or the processes may be performed in parallel.

Figure 8:
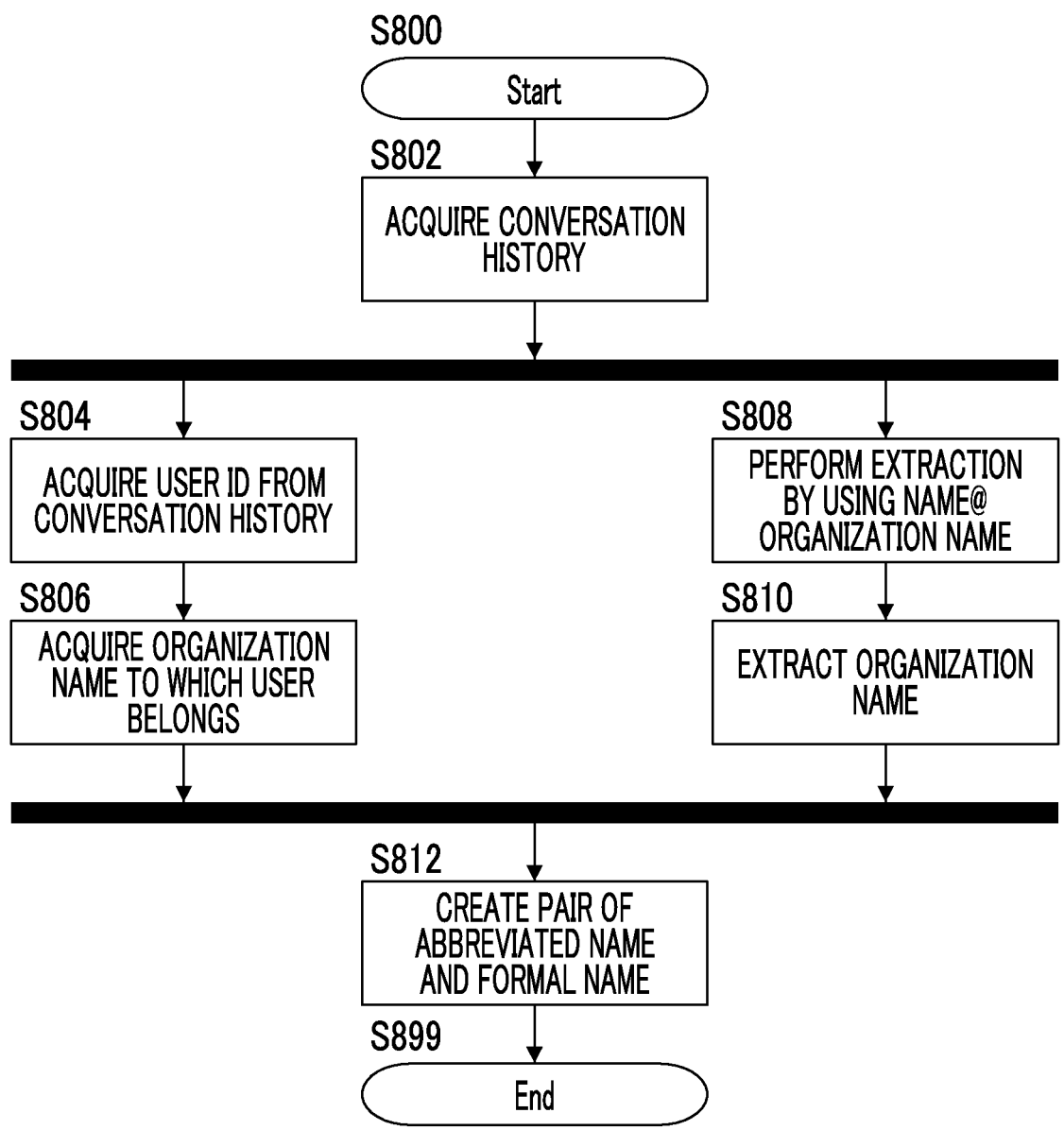
FIG. 8 is a flowchart illustrating a processing example according to this exemplary embodiment.

FIG. 8 is a flowchart illustrating a processing example according to this exemplary embodiment. The drawing illustrates a processing example in a case where a target information group is set to be a conversation history.

In step S802, the document acquisition module 110 acquires a target conversation history.

In step S804, the creator ID acquisition module 130 acquires a user ID from the conversation history. Specifically, a user ID (a user ID registered in the communication processing apparatus 240) of a user who has performed conversation in the conversation history may be acquired.

In step S806, the creator belonging organization acquisition module 140 acquires an organization name to which the user belongs. Specifically, a belonging organization corresponding to the user ID is acquired using the character belonging table 400.

In step S808, the abbreviated name description location text acquisition module 120 performs extraction by using name@organization name. Specifically, "name@organization name" ("name" indicates a user name, and is followed by a letter string including "@") as a regular expression is extracted from the conversation history by using the abbreviated name description location table 300.

In step S810, the organization name acquisition module 125 extracts an organization name. Specifically, an "organization name" portion in a letter string matching "name@organization name" which is a regular expression may be extracted.

In step S812, the creator belonging organization acquisition module 140 creates a pair of an abbreviated name and a formal name by using the formal organization name acquired in step S806 and the abbreviated name extracted in step S810.

Step S804 and step S808 are performed after step S802 is performed.

Any one of the processes of extracting a formal name which are performed in step S804 and step S806 and the processes of extracting an abbreviated name which are performed in step S808 and step S810 may be performed first, or the processes may be performed in parallel.

Figure 9:
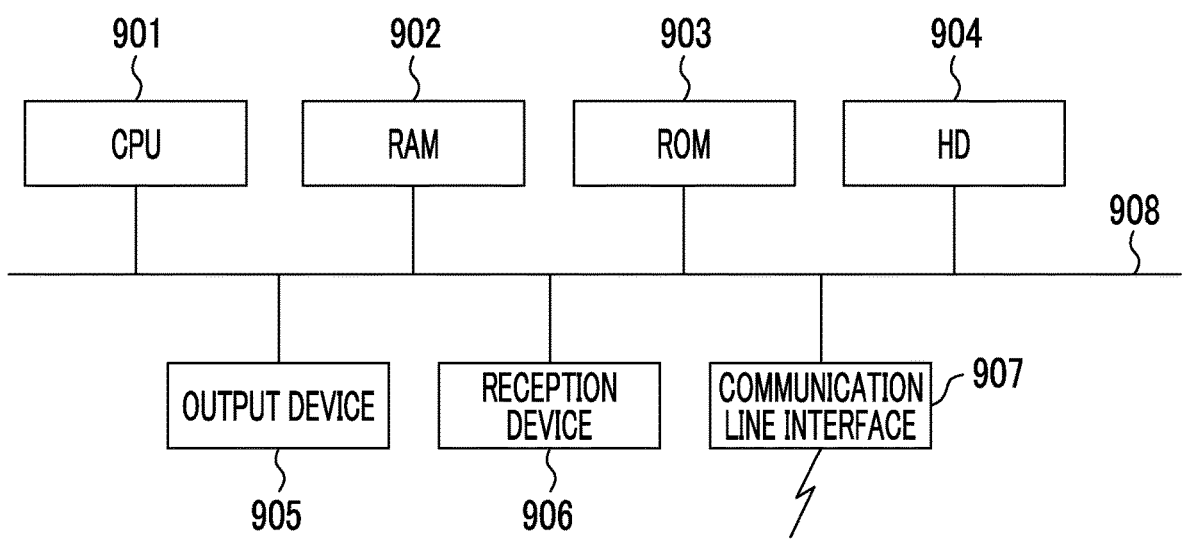
FIG. 9 is a block diagram illustrating a hardware configuration example of a computer for realizing this exemplary embodiment.

Meanwhile, a hardware configuration of a computer executing a program as this exemplary embodiment is a general computer as illustrated in FIG. 9, and specifically, is a personal computer, a computer serving as a server, or the like. That is, as a specific example, a CPU 901 is used as a processing unit (computational unit), and a RAM 902, a ROM 903, and an HD 904 are used as storage devices. As the HD 904, for example, a hard disk or a Solid State Drive (SSD) may be used. The computer includes the CPU 901 that executes programs such as the document acquisition module 110, the abbreviated name description location text acquisition module 120, the organization name acquisition module 125, the creator ID acquisition module 130, and the creator belonging organization acquisition module 140, the RAM 902 that stores the programs and data, the ROM 903 that stores programs for starting up the computer, and the like, the HD 904 which is an auxiliary storage device (may be a flash memory or the like) including functions as the document database 105, the abbreviated name description location storage module 115, the character belonging database 135, and the abbreviated name-formal name pair recording module 145, a reception device 906 that receives data on the basis of a user's operation (including a motion, a sound, an eye gaze, and the like) with respect to a keyboard, a mouse, a touch screen, a microphone, a camera (including an eye gaze detection camera, and the like), and the like, an output device 905 such as a CRT, a liquid crystal display, or a speaker, a communication line interface 907, such as a network interface card, for connection to a communication network, and a bus 908 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 9 shows one configuration example. This exemplary embodiment is not limited to the configuration illustrated in FIG. 9, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 9 maybe connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
acquire a document, from a plurality of documents, in which an abbreviated name is used, wherein each of the documents corresponds to a different type of documents where a corresponding abbreviated name is used at a different predetermined position in a corresponding document,
wherein the documents comprise a first document and a second document,
wherein the first document corresponds to a first type of document, and a first abbreviated name is used at a first position in the first document, and
wherein the second document corresponds to a second type of documents, and a second abbreviated name is used at a second position in the second document, and
wherein the abbreviated name is an abbreviated name of an organization name, and wherein the formal name is a formal organization name;
determine a type of the acquired document to identify a position where the abbreviated name is used,
wherein: when the type of documents is an electronic mail, the abbreviated name is extracted from a greeting phrase in the electronic mail, when the type of documents is a conversation history, the abbreviated name is extracted from a predetermined letter string in the conversation history;
extract the abbreviated name from the specified position by using named entity extraction;
extract a formal name from a character belonging table between user information and formal names on a basis of a character appearing in the acquired document, wherein the character appearing in the acquired document is a user associated with the acquired document;
associate the abbreviated name and the formal name with each other; and
converting the abbreviated name used in the acquired document to the associated formal name.

2. The information processing apparatus according to claim 1, wherein the processor extracts an organization to which the character belongs, as a formal name, from the character belonging table.

3. The information processing apparatus according to claim 1, wherein the document is an electronic mail, and wherein the character related to the document is a transmitter of the electronic mail.

4. The information processing apparatus according to claim 3, wherein the processor extracts an abbreviated name from a greeting phrase in the electronic mail, and wherein the processor extracts an organization to which the transmitter belongs, as a formal name.

5. The information processing apparatus according to claim 1, wherein the character related to the document is a creator of the document.

6. The information processing apparatus according to claim 5, wherein the processor extracts an abbreviated name from a predetermined location in the document, and wherein the second processor extracts an organization to which the creator belongs, as a formal name.

7. The information processing apparatus according to claim I, wherein the document is a conversation history, and wherein the character related to the document is a person concerned with the conversation.

8. The information processing apparatus according to claim 7, wherein the processor extracts an abbreviated name from a predetermined letter string in the conversation history, and wherein the processor extracts an organization to which the person concerned with the conversation belongs, as a formal name.

9. The information processing apparatus according to claim 1, wherein in a case where the processor is capable of extracting a plurality of abbreviated names, the processor performs any one of extraction of an abbreviated name of which the described order is a predetermined order, extraction of the abbreviated name in accordance with the number of letters, and extraction of an abbreviated name similar to the formal name.

10. The information processing apparatus according to claim 1, wherein in a case where the processor is capable of extracting a plurality of formal names, the processor performs any one of extraction based on a date when the user belongs to an organization and extraction of a formal name similar to the abbreviated name.

* * * * *